Dec. 1, 1936.  P. N. MARTIN  2,062,521

RAILWAY TRACK CIRCUIT APPARATUS

Filed Nov. 23, 1933

INVENTOR
Paul N. Martin
BY
HIS ATTORNEY

Patented Dec. 1, 1936

2,062,521

UNITED STATES PATENT OFFICE 2,062,521

RAILWAY TRACK CIRCUIT APPARATUS

Paul N. Martin, Swissvale, Pa., assignor to The Union Switch & Signal Company, Swissvale, Pa., a corporation of Pennsylvania Application November 23, 1933, Serial No. 699,381

13 Claims. (Cl. 246—41)

My invention relates to railway track circuit apparatus, and has for an object the provision of novel and useful apparatus for improving the shunting sensitivity of the track circuit and for expediting the release of the track relay armature when a vehicle enters the track section with which the track relay is associated. Other features and advantages of my invention will appear as the specification progresses.

I will describe five forms of apparatus embodying my invention, and will then point out the novel features thereof in claims.

Figure 1:
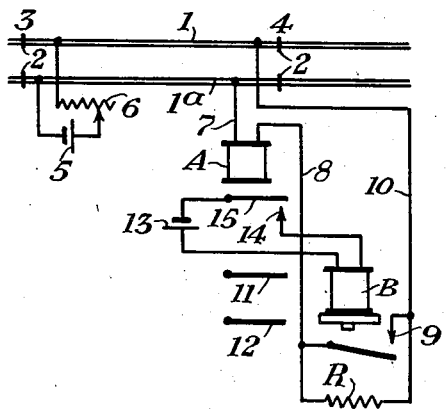
Figure 2:
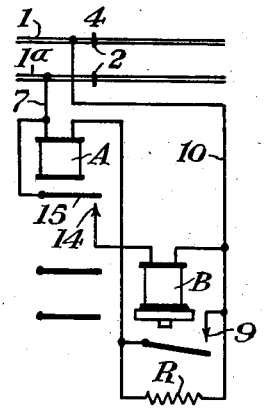
Figure 3:
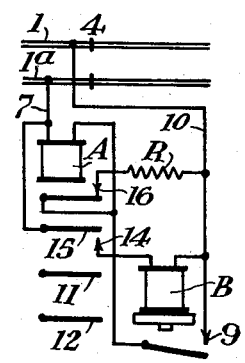
Figure 4:
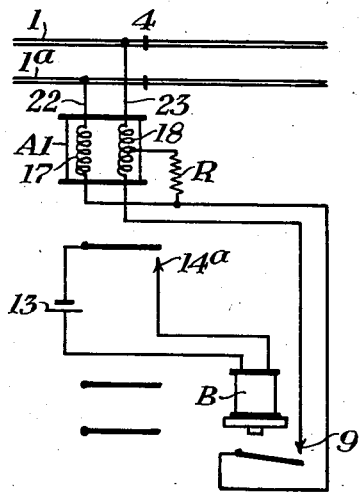
Figure 5:
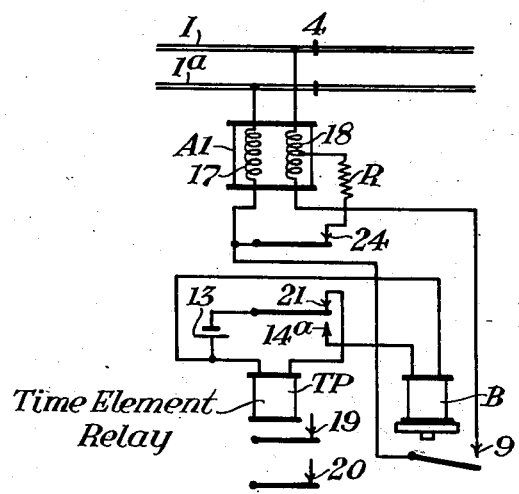

In the accompanying drawing, Fig. 1 is a diagrammatic view showing one form of track circuit apparatus embodying my invention. Figs. 2 and 3 are diagrammatic views showing track circuit apparatus also embodying my invention and which are similar to Fig. 1 except the auxiliary relay is energized from the track circuit source of current rather than by a separate source, and in Fig. 3 the track relay is further provided with a stick contact which is included in the holding circuit. Fig. 4 is a diagrammatic view of still another form of apparatus embodying my invention, and wherewith the shunting sensitivity is increased and the shunting time is decreased not only by adding resistance in series with the track relay winding but also by decreasing the effective turns of the winding. Fig. 5 is a diagrammatic view representing a modification of Fig. 4, the chief difference being that a repeater or secondary relay is added, which, with the track relay provides a "so-called" primary-secondary relay combination wherewith false signal operation due to momentary loss of train shunt is avoided, and which form of apparatus also embodies my invention.

In each of the several views like reference characters designate similar parts.

For high shunting sensitivity, it is desirable to maintain the normal track relay energy level as near to its release value as possible. The limitation to which the usual track relay is subject, namely, that the energization at pickup must be greater than the energization at release, noticeably decreases the shunting sensitivity of the track circuit, assuming all other factors to remain constant. Apparatus embodying my present invention is useful in eliminating partly or wholly the effect of the spread between pickup and release energization values with the result that the shunting sensitivity of the track circuit is materially increased.

The normal energy level of the usual track relay being something above the pickup value of the relay, the train shunt must be sufficiently effective to bypass the increment of current above the release value. Not only does this require a relatively low train shunt resistance, but the shunting time is relatively long because the relay flux requires a relatively long time to die down from this high energy level to the release level. Apparatus embodying my present invention makes it possible to reduce the normal energy level for the track relay below the pickup value by inserting a resistance in series with the operating winding of that relay after it picks up, and hence the time required for the relay flux to die down to the release value is greatly reduced. A further advantage arising from the use of a resistance is that the addition of resistance in series with the inductance of the track relay results in a more rapid flux decay. This result will be understood from the consideration of the time constant of an inductive circuit having resistance in series therewith.

The primary-secondary relay combinations, consisting of a track relay and a slow pickup repeater relay, heretofore proposed for avoiding false signal operation in the event of a momentary loss of train shunt, or an intermittent high resistance train shunt, may not be effective because if the track or primary relay once picks up after a train shunt has caused it to release, it remains energized over its pickup circuit until the secondary relay picks up also to transfer the track relay to its holding circuit, and thus there is a likelihood of a false clear signal flip of the controlled signals. My present scheme as shown by Fig. 5 is effective in the event the train shunt resistance becomes high enough to allow the track relay to pick up to at once transfer that relay to its holding circuit and hence reduce its energization so that it would be more likely to release again before the secondary relay has picked up.

Referring to Fig. 1, the reference characters 1 and 1ª designate the traffic rails of a stretch of railway track which are formed by insulated rail joints 2 into a track section 3—4. The track section 3—4 is provided with a track circuit which comprises as its essential elements the traffic rails bonded in the customary manner, a source of current connected across the traffic rails at one end of the section and a track relay adapted to receive energy from the traffic rails at the other end of the section. In Fig. 1, the source of current for the track circuit is shown as a track battery 5 which has one terminal connected with the rail 1ª and its opposite terminal connected with the rail 1 through a current-limiting resistor 6. The reference character A designates a direct current neutral relay of the usual type and which is connected across the traffic rails of the section over either a pickup circuit or a holding circuit. The pickup circuit can be traced from the rail 1a over wire 7, operating winding of relay A, wire 8, front contact 9 of an auxiliary relay B to be referred to later and wire 10 to the opposite rail 1. The holding circuit for relay A includes the same elements above pointed out for the pickup circuit except it includes a resistor R, the front contact 9 of the relay B when closed being effective to short circuit the resistor R, as will be readily understood by an inspection of Fig. 1. It is clear, therefore, that as long as the auxiliary relay B is deenergizing, the track relay A is energized by current supplied from the track battery 5 over the holding circuit including the resistor R, and when the auxiliary relay B is picked up, the current supplied by the track battery 5 flows to the winding of the relay A over the pickup circuit which includes the front contact 9 of relay B and hence materially increases the energization of the track relay over its former energization.

The track relay A is provided with contacts 11 and 12 which may be utilized for controlling traffic governing devices in any desired manner.

The auxiliary relay B is a direct current neutral relay preferably having slow-release characteristics. Relay B is provided with an energizing circuit easily traced and which includes a battery 13 and a back contact 14 of relay A. Consequently, relay B is normally deenergized and is energized when and only when the relay A is released and its contact 15 engages the back contact 14.

In describing the operation of the apparatus of Fig. 1, I shall first assume that the track section 3—4 is unoccupied. Under this normal condition the track relay A is picked up and the auxiliary relay B is deenergized as illustrated in Fig. 1. The resistor 6 must have low enough resistance to provide sufficient energy to allow relay A to pick up, contact 9 being closed, under the condition of minimum ballast resistance. The resistor R will be chosen of such a value as to decrease the energy level of the relay A from that required to pick up the relay to almost the release value. Maximum shunting sensitivity is obtained with such an adjustment, assuming other factors to remain constant. When the ballast dries out and the ballast resistance becomes high, of course, some shunting sensitivity will be sacrificed with the usual track circuit.

When the traffic rails 1 and 1a of section 3—4 are shunted by the wheels and axles of a vehicle entering the section, the current supplied to the track relay A will be greatly reduced. It is clear that with the energy level of the relay A normally reduced nearly to the release value by virtue of the resistor R being inserted in the circuit, a very quick decay of the relay flux to the release value will follow, and a very quick release of the contacts 11, 12 and 15 will be assured. With the track relay A deenergized, current will be supplied to the auxiliary relay B and that relay will be picked up closing its front contact 9. The closing of the front contact 9 of relay B connects the pickup circuit of relay A across the traffic rails 1 and 1a, but as long as the vehicle occupies the section 3—4, the voltage across the operating winding of the track relay will be less than the pickup voltage. When the vehicle vacates the section, the voltage across the operating winding of relay A will be approximately the full voltage across the traffic rails and a high energy level for the relay will be obtained with the result that a prompt closing of the relay will be assured. The picking up of the relay A opens the circuit for the auxiliary relay B and that relay will be deenergized, but being slow releasing in character, the front contact 9 will be retained closed during the release period with the result that the relay A will reach its fully energized condition before the resistor R will be inserted in series with its operating winding and the energy level reduced. The period during which the energizing circuit for the relay B is closed will be ordinarily only a small percent of the entire time and hence the discharge of the battery 13 will be small, assuring a relatively long life for that battery. It is clear from the foregoing description that during the pickup period of the track relay a relatively high energy level prevails to assure reliable closing of the relay, and that normally the energization of the relay will be reduced to nearly the release value with the result that a high shunting sensitivity for the track circuit prevails and a quick release of the relay will be effected when a vehicle enters the section.

Referring to Fig. 2, the apparatus is exactly the same as in Fig. 1 except the battery 13 is omitted and the winding of the auxiliary relay B is connected across the traffic rails to receive current from the track battery. One terminal of the winding of relay B is connected with the wire 10 leading to the rail 1 and its opposite terminal is connected with the rail 1a over the back contact 14 and contact 15 of the relay A and the wire 7. The operation of the apparatus of Fig. 2, in view of the foregoing description of the apparatus of Fig. 1, will be clear and it is deemed sufficient to point out that relay B is normally disconnected from the rails and takes no energy from the track battery. During the time a vehicle occupies the section, the winding of the relay B is connected across the traffic rails but is shunted by the vehicle the same as the track relay A. Immediately following the vacating of the track section by the vehicle, current will flow from the track battery to the winding of the relay B and that relay will be picked up, the relay B in this case being preferably provided with a relatively low pickup value. Relay A will also immediately receive current following the vacating of the section but the resistor R being in series with its operating winding, its energization will not ordinarily be sufficient to pick it up. With the relay B up, however, the closing of the front contact 9 shunts out the resistor R and the current flow for the relay A will be materially increased with the result that that relay will now be picked up. As soon as the relay A is picked up, the auxiliary relay B will be disconnected from the traffic rails and will become deenergized. The slow-release characteristic of the relay B assures that the shunt around the resistor R is maintained until after relay A has been fully established in its picked up position.

In Fig. 3 the apparatus is exactly as Fig. 2 except a front contact 16 of relay A is added as a stick contact in the holding circuit in series with the resistor R. The operation of the apparatus of Fig. 3, in view of the foregoing description, will be clear and it is deemed sufficient to point out that normally relay B takes no energy from the track battery. By virtue of the resistor R being in series with the winding of the relay A a high shunting sensitivity for the track circuit and a quick release of the track relay A is assured. In Fig. 3 when a vehicle leaves the track section, current will at first flow to the relay B only and then, when that relay is picked up, current will flow to the relay A over the pickup circuit including the front contact 9. The slow-release characteristic of relay B will maintain the contact 9 closed for a period sufficient to assure that relay A will reach its fully energized condition, before the resistor R is inserted in the circuit and the energy level for the track relay is reduced. It is to be noted that the pickup times for the two relays B and A of Fig. 3 are added before the circuit controlling contacts 11 and 12 of relay A are closed. That is to say, a slow pickup characteristic is provided for the control contacts.

In the modified form of apparatus shown in Fig. 4, the shunting sensitivity of the track circuit is increased and the release of the track relay expedited not only by inserting resistance in series with the relay winding but also by decreasing the effective turns of the winding. For convenience, the operating winding of the track relay A1 is illustrated in the form of two coils 17 and 18 corresponding to the two coils of the usual electromagnet. As viewed in the drawing, the upper terminal of coil 17 is connected with the rail 1a over a wire 22 and the upper terminal of the coil 18 is connected with the rail 1 over a wire 23, the two lower terminals of the coils 17 and 18 being connected together over the front contact 9 of the auxiliary relay B. The resistor R is connected between the lower terminal of the coil 17 and an intermediate terminal of the coil 18 as will be readily understood by an inspection of Fig. 4. It follows that the pickup circuit for the relay A1 includes the entire operating winding of that relay with the resistor R in parallel with a portion of the winding, whereas the holding circuit includes only a portion of the operating winding and the resistor R which is preferably so proportioned as to compensate for the reduced resistance of the relay winding. The auxiliary relay B of Fig. 4 is supplied with current from a separate battery 13 over the back contact 14a of the track relay A1 similar to the arrangement shown in Fig. 1.

The operation of the apparatus of Fig. 4 is as follows: Normally the auxiliary relay B is deenergized and the track relay A1 is supplied with current from the usual track battery, such for example as the battery 5 of Fig. 1, over the holding circuit which includes the coil 17, resistor R, and the upper portion of the coil 18. The intermediate terminal of the coil 18 is so adjusted and the resistor R is so proportioned that the normal energization is only slightly greater than the release value for the relay. The low normal energy level for relay A1 assures a high shunting sensitivity and a very quick release of the relay in response to a vehicle entering the section. With relay A1 down, the auxiliary relay B is picked up closing the pickup circuit for relay A1 across the traffic rails, but as long as a vehicle occupies the section, the voltage across the full operating winding will be less than the pickup voltage. When the vehicle vacates the section, the voltage across the full operating winding of the track relay A1 will rise above the pickup value and that relay will close. With relay A1 picked up, the auxiliary relay B is deenergized, leaving the relay A1 connected across the traffic rails over its holding circuit. The slow-release characteristic of relay B will be effective to retain the front contact 9 closed for a period sufficiently long that relay A1 will reach its fully energized condition before its energization is reduced. The number of turns that may be cut out of the operating winding of relay A1 by the holding circuit, is determined chiefly by the ratio of the release value of this relay to its pickup value. The parts may be so proportioned that both the release current and the release voltage of the relay combination are made to approach the pickup current and the pickup voltage, respectively. I have found that the arrangement of Fig. 4 gives even faster shunting time and slightly higher shunting sensitivity than where the series resistance alone is provided.

The arrangement shown in Fig. 5 is similar to Fig. 4, and differs chiefly in that a time element repeater relay TP is added to provide a so-called primary-secondary relay combination. The relay TP may be any one of several types characterized by having its front contacts not closed until after the winding of the relay is energized for a predetermined interval. The relay TP is energized over a simple circuit easily traced and which includes a front contact 21 of the track relay A1, and hence serves as a track repeater relay. That is to say, relays A1 and TP constitute a so-called primary-secondary relay combination. The contacts 19 and 20 of relay TP may be utilized to control traffic governing devices as may be desired. The apparatus of Fig. 5 further differs from that of Fig. 4 by having the resistor R connected with the coil 17 of relay A1 over a front contact 24 of the relay.

Under the normal operating condition for the apparatus of Fig. 5, the auxiliary relay B is deenergized and both the primary relay A1 and the secondary relay TP are energized. The intermediate terminal for the coil 18 is so adjusted and the resistor R is so selected that the normal energization of the primary relay A1 is relatively low, being reduced to a value only enough above the release value to assure reliable operation under various ballast conditions. This low energy level for the relay A1 is effective to provide a relatively high shunting sensitivity and a quick release in response to a vehicle entering the section the same as described for Fig. 4. With the primary relay A1 down, the circuit for the secondary relay TP will be opened and the latter relay will be deenergized to release its traffic controlling contacts 19 and 20. The releasing of the relay A1 will also close the circuit for the auxiliary relay B and that relay will be picked up, closing the pickup circuit for the relay A1 across the traffic rails. When the vehicle leaves the section, the track voltage will be applied across the full operating winding of relay A1, giving that relay a relatively high energy level during its pickup period. The picking up of the relay A1 opens the circuit for the auxiliary relay B and closes the circuit for the secondary relay TP. The auxiliary relay B will function at the end of its slow-release period to open the pickup circuit of the relay A1, leaving that relay energized over its holding circuit, and the secondary relay TP will function at the end of its slow-pickup period to close the traffic controlling contacts 19 and 20. The slow-release period for the auxiliary relay B will preferably be less than the slow-pickup period of the secondary relay TP so that the primary relay A1 will be transferred to its holding circuit prior to the closing of the traffic governing contacts 19 and 20. In the event the vehicle travelling the section is of light weight and conditions are such that only a relatively high train shunt resistance (within limits, of course) is provided, it will still cause the track relay A1 to release the same as in the previous forms of my present invention. If the resistance of the train shunt varies intermittently as the vehicle advances through the section, the primary relay A1 may pickup and release following the variations of the train shunt resistance, without the secondary relay TP picking up and closing the traffic governing front contacts 19 and 20. With the usual primary-secondary relay combination, the secondary relay must pick up before the primary relay is transferred from its pickup circuit to its holding circuit. Consequently, after a train has entered the section and caused the relays to release, if the train shunt momentarily becomes high enough to allow the primary relay to pick up, the primary relay is likely to be retained picked up until the secondary relay picks up and transfers it to its holding circuit and thereby reduces its energization. The result of such a condition is that there will occur a period when the traffic governing front contacts of the secondary relay are closed, that is to say, a false clear flip of the traffic governing devices will occur. With the apparatus of Fig. 5, after a train has entered the section and caused the relays A1 and TP to release, if a high train shunt occurs so that the primary relay A1 is picked up, the auxiliary relay B functions immediately to transfer the relay A1 to its holding circuit and reduces its energization. The reduction of the energization of the relay A1 when transferred to its holding circuit will, under ordinary variations of train shunt, be sufficient to release that relay and hence stop the energization of the time element secondary relay TP before that relay has picked up to close the traffic governing contact. Should the intermittent high train shunt persist for an extended period, there would result only a pumping action of the relays A1 and B without operation of the traffic governing contacts of the secondary relay TP. Consequently, the auxiliary relay B when applied to a primary-secondary relay combination will be effective to avoid false operation of the traffic governing devices when intermittently high train shunt resistances occur.

Although direct current track circuits and direct current relays have been illustrated for the sake of simplicity, it will be understood that I do not wish to limit myself to direct current apparatus. It will be apparent that the fundamental principles of connecting a resistor or impedance in circuit with the operating winding of a track relay, or altering the number of effective turns, or both, through the medium of a normally deenergized auxiliary relay for increasing the shunting sensitivity and decreasing the shunting time, can be applied to track circuits of the alternating current type or of any other suitable form of electrical energy.

Although I have herein shown and described only five forms of apparatus embodying my invention, it is understood that various changes and modifications may be made therein within the scope of the appended claims without departing from the spirit and scope of my invention.

Having thus described my invention, what I claim is:

1. In combination with a section of railway track and a source of current connected across the rails of the section, a track relay and an auxiliary relay, a pickup circuit for the track relay connected across the rails of the section and including the full operating winding of the track relay and a front contact of the auxiliary relay, a holding circuit for the track relay connected across the rails of the section and including a shunt path around said front contact and a portion of said operating winding, and means for energizing said auxiliary relay when and only when the armature of the track relay is down.

2. In combination with a section of railway track and a source of current connected across the rails of the section, a track relay and an auxiliary relay, a pickup circuit for the track relay connected across the rails of the section and including the full operating winding of the track relay and a front contact of the auxiliary relay, a holding circuit for the track relay connected across the rails of the section including a resistor and only a portion of the operating winding, and means for energizing the auxiliary relay including a back contact of the track relay.

3. In combination, a first and a second relay, means for energizing the second relay when and only when the armature of said first relay is released, an energizing circuit for said first relay including the entire operating winding of said first relay, and means operating when said second relay is deenergized to cut a portion of the winding of said first relay out of the energizing circuit.

4. In combination, a first and a second relay, means for energizing said second relay when and only when the armature of said first relay is released, a circuit having two branches one of which includes the entire operating winding of said first relay and the other of which includes only a portion of such winding, and means for closing the first or the second of said branches according as said second relay is energized or deenergized.

5. In combination, a first and a second relay, means for energizing said second relay when and only when the armature of said first relay is released, a circuit having two branches one of which includes the entire operating winding of said first relay and the other of which includes only a portion of such winding and a resistor, and means for rendering effective the first or the second of said branches according as said second relay is energized or deenergized.

6. In combination, a first and a second relay, means for energizing said second relay when and only when the armature of said first relay is released, and means operating when the armature of said second relay is picked up to increase the effective turns of said first relay and so decrease the current value at which the armature of said first relay will pick up.

7. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including a resistor permanently connected across the terminals of said front contact, and a circuit for energizing said auxiliary relay including a back contact of said track relay.

8. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including a resistor permanently connected across the terminals of said front contact, and means for energizing said auxiliary relay when and only when the armature of said track relay is down.

9. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including an impedance permanently connected across the terminals of said front contact, and means for energizing said auxiliary relay when and only when the armature of said track relay is down.

10. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including a resistor permanently connected across the terminals of said front contact, another source of current, and a circuit effective to energize said auxiliary relay including said other source of current and a back contact of said track relay.

11. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including a resistor permanently connected across the terminals of said front contact, and a circuit connected across the rails of the section for energizing said auxiliary relay and including a back contact of said track relay.

12. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including a resistor permanently connected across the terminals of said front contact, and means for energizing said auxiliary relay from the rails of said section effective when and only when the armature of said track relay is down.

13. In combination with a section of railway track and a source of current connected across the rails of said section, a track relay and an auxiliary relay, a pickup circuit for said track relay connected across the rails of the section and including a front contact of said auxiliary relay, a holding circuit for said track relay connected across the rails of the section and including an impedance permanently connected across the terminals of said front contact, and means for energizing said auxiliary relay from the rails of said section effective when and only when the armature of said track relay is down.

PAUL N. MARTIN.